United States Patent [19]

Borner et al.

[11] Patent Number: 4,859,111

[45] Date of Patent: Aug. 22, 1989

[54] UNISEX CONNECTOR

[75] Inventors: Willy Borner, Cupertino; Kenneth A. McQueeney, Los Gatos, both of Calif.

[73] Assignee: Balco, Inc., San Jose, Calif.

[21] Appl. No.: 255,123

[22] Filed: Oct. 6, 1988

[51] Int. Cl.⁴ ............................................. F16B 2/04
[52] U.S. Cl. ................................. 403/340; 403/393; 403/71
[58] Field of Search ................... 403/70, 71, 289, 300, 403/331, 339, 340, 393

[56] References Cited

U.S. PATENT DOCUMENTS

| | | | |
|---|---|---|---|
| 1,528,988 | 3/1925 | Platts et al. | 403/331 |
| 3,092,403 | 6/1963 | Gerdeman | 403/331 X |
| 3,679,249 | 7/1972 | Hoffman | 403/71 X |
| 4,634,202 | 1/1987 | Taylor | 403/340 X |

*Primary Examiner*—Randolph A. Reese
*Assistant Examiner*—Arlen L. Olsen
*Attorney, Agent, or Firm*—Irell & Manella

[57] ABSTRACT

A connector for joining two strings in precise axial alignment including a first enlarged section having a bore with a recess for receiving a knotted connector string, a second reduced-diameter section having alignment surfaces, and a third section having clip ends. Two such connectors are clipped together by inverting one and placing its clip ends over the second section of the other connector. The connectors are preferably of unitary plastic design, such that the clip ends are substantially rigid, with some resilience to allow for clipping. The inner shape of the clip ends corresponds to the outer shape of the second sections, and may be circular, trapezoidal, or some other shape. Clip ends may be provided with elongated ends to assist in removing the connectors from one another. The connector is designed to clip coaxially to another connector, such that the two string lines are coaxial, thus avoiding lateral forces from being exerted by the string lines on the connectors when assembled. A ridge may be provided in the second section to enhance rigidity. The connectors are disassembled by cocking or twisting one connector relative to the other.

15 Claims, 6 Drawing Sheets

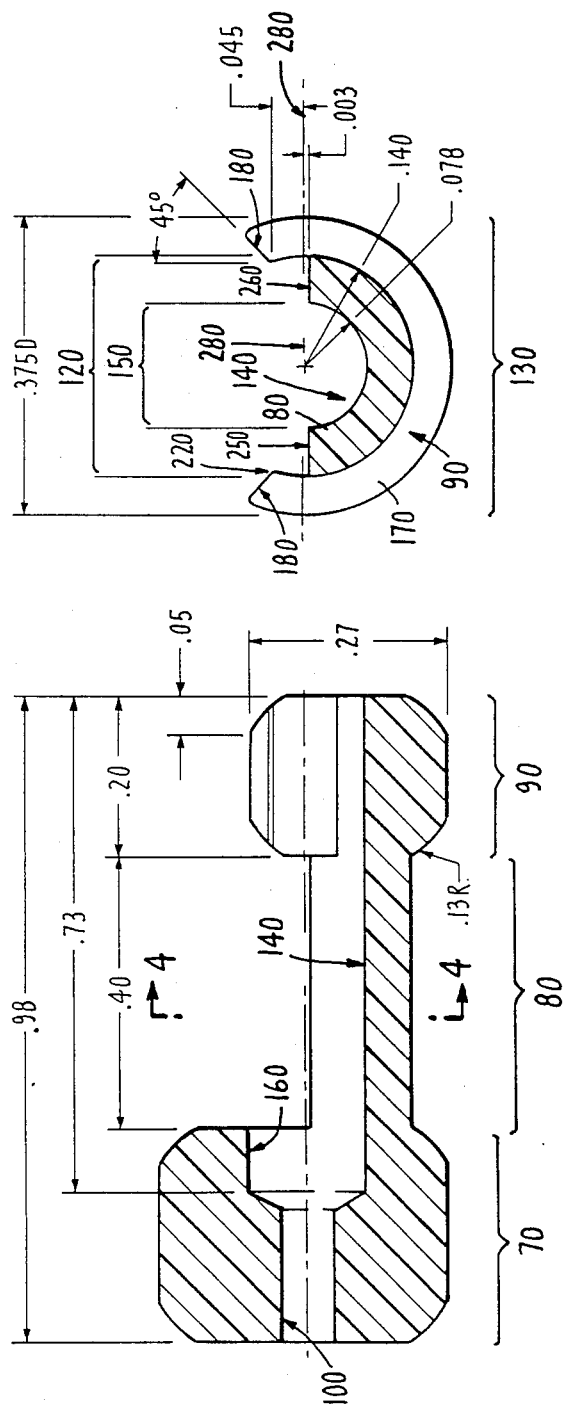
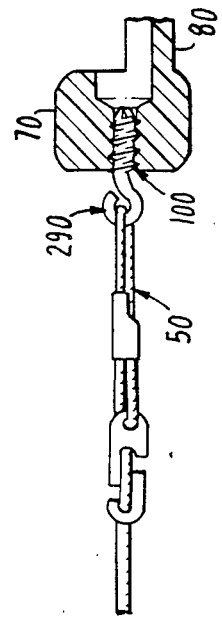
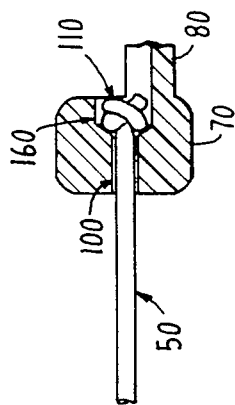
FIG. 4.
FIG. 5A.
FIG. 3
FIG. 5.

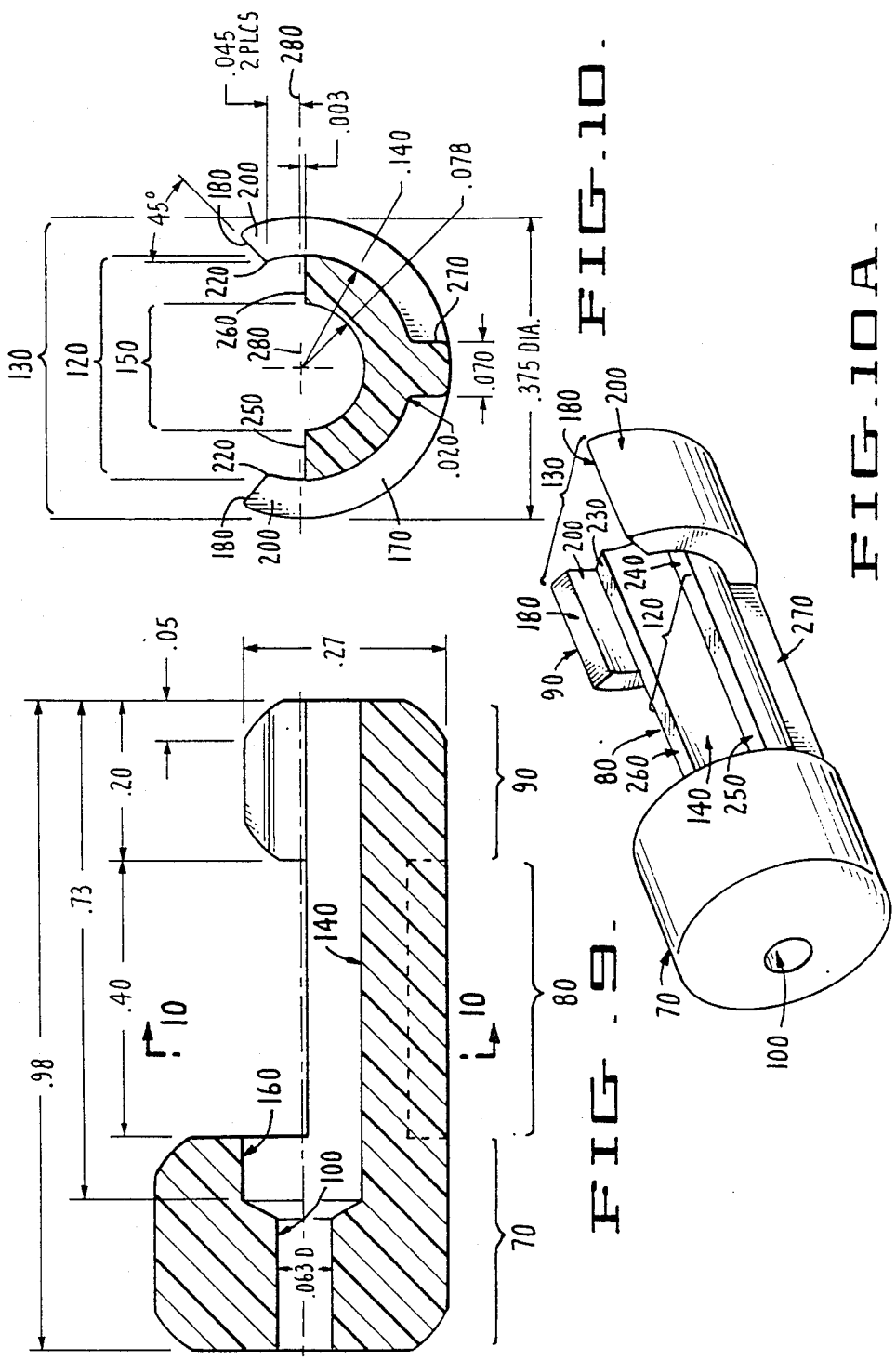

UNISEX CONNECTOR

FIELD OF THE INVENTION

This invention concerns a simple connector device for joining flexible strings or the like in precise axial alignment. The connector is advantageously employed in wheel alignment systems.

DESCRIPTION OF PRIOR ART

In wheel aligning systems it is customary to mount alignment heads on the wheels being aligned and then determine the angles between the various alignment heads. One widely used way to determine these angles involves physically connecting angle measuring transducers in the various heads to one another with strings. As the strings are pulled tight, the angles among the various heads are determined. Such a system, for instance, is described in the user's manual to the INSTALIGNER wheel alignment system marketed by Snap-On Tools Corporation of Kenosha, Wis. Such user's manual, printed in Dec. 1987, by Snap-On Tools Corporation relative to INSTALIGNER model WA5000, is incorporated herein by reference.

In utilizing such a wheel alignment system, it is necessary to repeatedly manipulate the strings. It is convenient to be able to remove them for mounting the heads. The strings need to be shortened and lengthened from time to time, depending on the particular vehicle being aligned. Moreover, for good quality alignment results, the overall alignment system needs to be calibrated regularly. During calibration, the alignment heads are mounted on a small frame with short (5–15 inches) distances among them. In this setting, the strings need to be drastically shortened or removed.

With modern precision alignment systems, such as the Snap-On Tools INSTALIGNER machine, it is critical to not introduce unnecessary error into the various measurements. In many cases, errors of a half a degree or more cannot be tolerated. In the case of the calibration steps, with the very short distances among the various measuring heads, any displacement of a string such as is introduced by a connector which is not designed for precise axial alignment of its two joined strings can result in potentially unacceptable errors.

It is, of course, ironic that this precision and high accuracy equipment is being used in the grimy and often ill-lit setting of a wheel alignment pit, which calls for minimal complexity and simplicity and reproducibility of operation.

Heretofore, a range of simple connecting devices, such as J-shaped, U-shaped, or hook-and-eye type devices have been proposed to connect wheel alignment strings. While such devices have offered simplicity and, in the case of low-precision alignment equipment, acceptable levels of accuracy, with the more modern, higher precision devices, they can lead to unacceptable displacements of the center lines of the strings being joined. Unexpectedly, the friction between these simple devices is often great enough to prevent their axial alignment. Very minor degrees of misalignment when strings are being joined can introduce unexpectedly large errors into the wheel alignment process. What is needed is a quick and reliable method for coupling such strings which is capable of ensuring their coaxial alignment to a degree not heretofore available.

Thus, such a connector is needed and it would be particularly useful to have such a connector which would join to another connector like itself, without separate male and female connectors being necessary. This feature is especially useful during the calibration stage of operation, since it permits entire strings to be omitted and adjacent alignment heads to be directly coupled to one another without the need for male/female adaptors, and the like.

Accordingly, it is an object of the present invention to provide such a string connector which is unisexual in design, and provides fast and reliable means for connecting string lines in an axially-aligned fashion.

It is a further object of the invention to provide such a connector wherein a single connector design accomplishes the desired coupling, preferably by snapping together into a rigid body which does not have problems of friction-caused misalignment, and the like.

It is another object of the invention to provide such a connector which is of unitary resilient design and is inexpensive to manufacture.

SUMMARY OF THE INVENTION

The connector of the invention includes a first section for receiving a string line in a fixed fashion, and second and third sections for clamping together to third and second sections, respectively, of another identical connector. One connector is inverted with respect to the other, and the first sections (on the ends of the connectors) are clipped over the central (second) sections of the opposite connector. The second sections have reduced diameters to accommodate the clipping ends of the third sections Abutment surfaces are provided on the second and third sections to ensure coaxial alignment of the connectors, and to prevent the connectors from introducing displacement errors in the string line. The inner shape of the third section is adapted to conform substantially to the outer shape of the second sections, to ensure a tight clipping connection. A longitudinal ridge is preferably provided on the second section to assist in maintaining rigidity.

The clip ends of the third sections may be elongated, angled or otherwise adapted to allow easy removal. When two connectors are clipped together, they may be removed by prying the clip ends away from the second sections, or by twisting one connector relative to another (in an angled fashion relative to the axes of the connector) to separate them.

The inner shape between the clip ends of the third sections of the connectors may be circular, trapezoidal, or some other desired shape.

In a preferred embodiment, the inner diameter of the third sections is reduced to provide abutment surfaces to meet the abutment surfaces of the second section.

BRIEF DESCRIPTION OF THE DRAWINGS

FIG. 3 is a longitudinal sectional view of the connector of FIG. 1;

FIG. 4 is a cross-sectional view taken along line 4—4 of FIG. 3;

FIG. 5 is a diagram showing the method of attachment of a line to the connector of the invention;

FIG. 5A is a diagram similar to that of FIG. 5, showing an alternative method of attachment of a line to the connector of the invention;

FIG. 9 is a longitudinal sectional view of an alternative embodiment of the invention;

FIG. 10 is a cross-sectional view taken along line 10—10 of FIG. 9;

FIG. 10A is a perspective view of a connector of the embodiment shown in FIGS. 9 and 10;

BRIEF DESCRIPTION OF THE PREFERRED EMBODIMENTS

Figure 1:
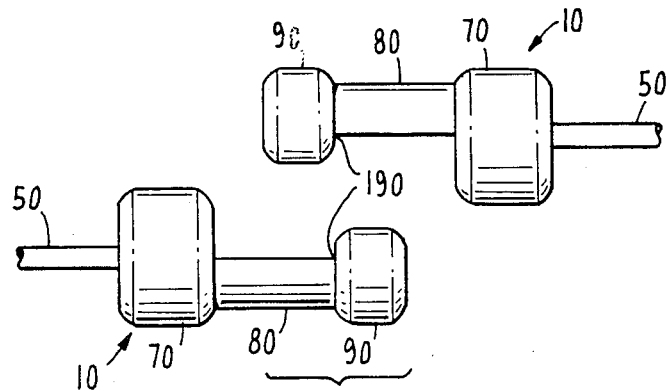
FIG. 1 is a side view of two connectors incorporating the presently preferred embodiment of the invention.
Figure 2:
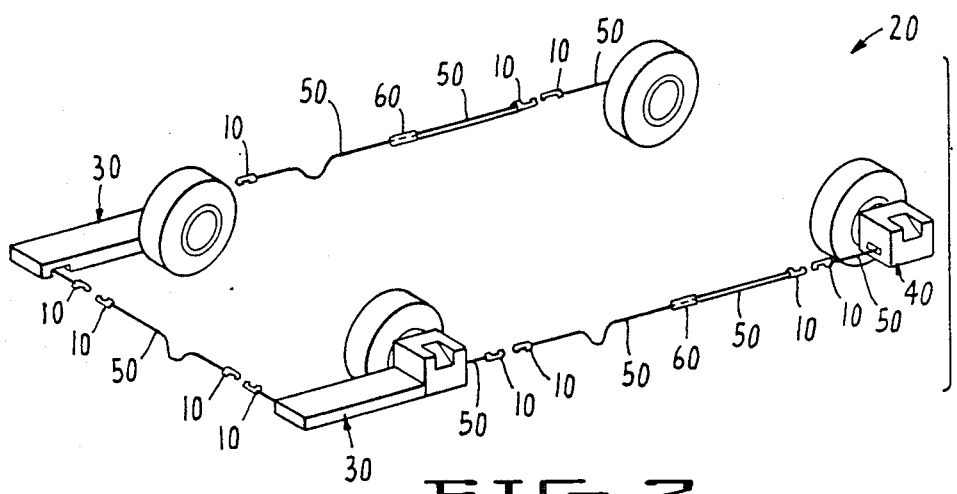
FIG. 2 shows the invention in use in a system for aligning automobile wheels.

FIG. 1 shows two identical connectors of the invention. As shown in FIG. 2, the connectors 10 are utilized in a wheel alignment system 20 which utilizes wheel alignment heads 30 and 40, such as in the IN-STALIGNER wheel alignment system mentioned above.

The alignment system 20 utilizes lines 50 (often referred to in the trade, and herein, as "toe lines") connected to the alignment heads 30 and 40. These are coupled within the alignment heads 30 and 40 to transducers (not shown) which detect the position and angle of the toe lines 50 at each head 30 or 40. Conventional tension adjusters 60 are utilized to maintain tautness on the toe lines 50 between the respective alignment heads. The toe lines 50 are made of a flexible material. While within this application the word "string" is sometimes used to refer to this material, it will be understood that that word is used expansively, and that any elastic or non-elastic flexible material such as cloth or plastic, threads, flexible cables, flexible wires, or other equivalent materials can be used, as well, without departing from the essential nature of this invention.

In order to allow for rapid and reliable connection and disconnection of the toe lines 50, pairs of clamp connectors 10 are provided at various points in the system 20.

Figure 2A:
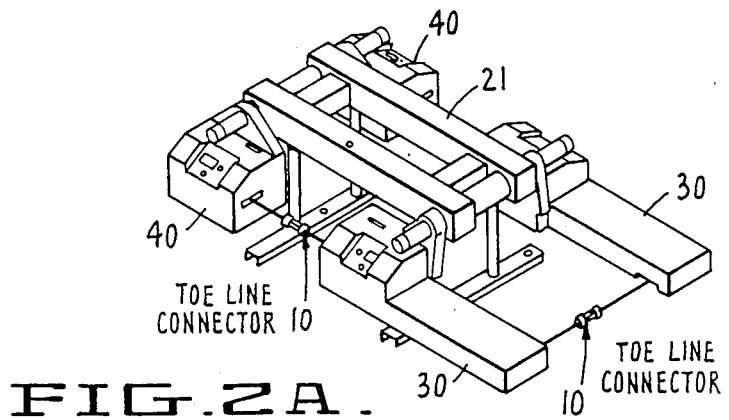
FIG. 2A shows the invention in use during the calibration step for a typical wheel alignment system.

In FIG. 2A, the various alignment heads 30 and 40 of alignment system 20 are mounted on a calibration frame 21 in the same configuration as they would be mounted on a vehicle. Again they are joined with strings but this time very close together. Thus, the connectors 10 need to be especially accurate in their alignment.

Referring to FIGS. 1 and 10A, the connector 10 includes a first section 70, a second section 80, and a third section 90. First section 70 includes a bore 100, as shown in FIGS. 3 and 5, and a toe line 50 is inserted through the bore 100 and fixed to the first section 70 by means of a knot 110. The knot may be permanently fixed in place by application of an adhesive or sealant. Alternative means for attaching the line 50 to the first section 70 may be utilized such as a self-threading eyelet screw for threading into the bore 100 (forming internal threads in the relative soft plastic of the bore 100 as the eyelet screw is turned), as shown in FIG. 5A. FIG. 5A illustrates one good mode for practicing the invention.

As can be seen, line 50 loops through the eyelet screw and joins back to itself some substantial distance from the eyelet screw. Due to the excellent axial alignment achievable with the present connectors, this type of connection can be used. Due to the high precision, however, one would not knot the line around the eyelet screw without worries that the friction between the knot and the eyelet would be great enough to introduce displacement errors into the axial alignment.

As best seen in FIGS. 3, 4 and 10A, section 80 has an outer diameter 120 which is smaller than the outer diameter 130 of the section 90. FIGS. 3 and 4 show exemplary dimensions for the invention, with dimensions being given in inches.

Section 80 includes a groove 140 having a diameter 150 as shown in FIGS. 3 and 4. A recess 160 is provided in the section 70 for receiving the knot 110.

Third section 90 includes an arcuate section 170 with beveled ends 180. As shown in FIG. 4, the beveling is preferably at approximately 45°. Section 90 also includes beveled edges 190, shown in FIG. 1, and resilient clip ends 200, shown in FIGS. 10 and 10A.

Figure 6:
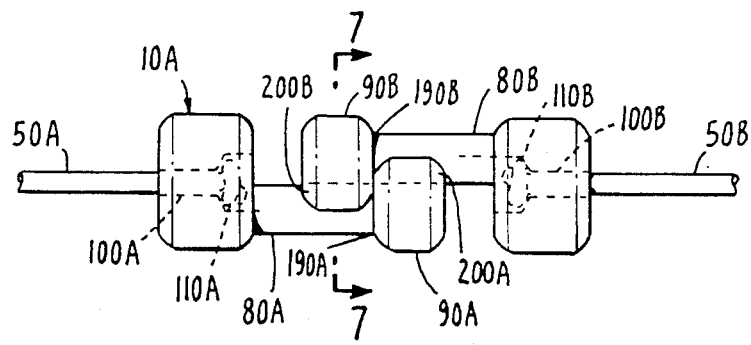
FIG. 6 shows the connectors of the invention in use.
Figure 7:
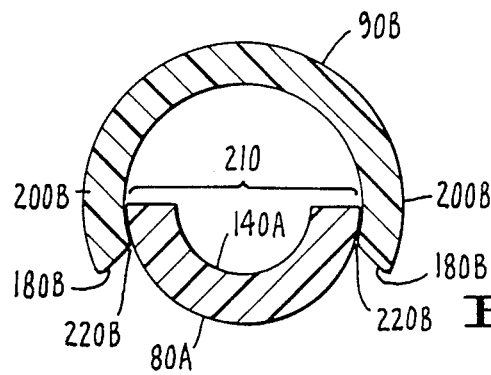
FIG. 7 is a cross-sectional view taken along line 7—7 of FIG. 6.

In order to utilize the invention, two connectors 10A and 10B (identical to the connectors 10) are placed into the configuration of FIG. 6. In FIGS. 6 and 7, the numbers correspond to similar parts of the invention as shown in FIGS. 3 and 4, with "A" and "B" relating to the left connector 10A and the right connector 10B, respectively. Thus, for example, connector 10A has string 50A attached to it as described above, and connector 10B has string 50B attached to it.

Connectors 10A and 10B have beveled areas 190A and 190B on their third sections 90A and 90B, respectively. In order to connect the connectors 10A and 10B as shown in FIGS. 6 and 7, section 90B is placed over section 80A. Section 90B has two clip ends 200B, section 90A has similar clip ends 200A. The inner diameter of the section 90B between clip ends 200B is, as depicted in FIG. 7, preferably substantially equal to the outer diameter 210 of section 80A. The connectors 10A and 10B are preferably formed from slightly resilient plastic or other somewhat elastic material, so that ends 200B may be clipped over section 80A as shown in FIG. 7.

In a symmetrical fashion, section 90A is clipped onto section 80B. It will be appreciated that when the connectors 10A and 10B are clipped together as shown in FIG. 6, tension on the strings 50A and 50B will tend to pull the connectors 10A and 10B apart. However, the connectors 10A and 10B will be prevented from being separated by abutment of the beveled areas 190A and 190B. Also, the connectors are prevented from slipping out of alignment with one another due to the clipping configuration shown in FIG. 7.

The forces generated by tension on the strings 50A and 50B are substantially confined to axial forces. This is ensured by the fact that the bores 140A and 140B (140B is not separately shown) are coaxial with the bores 100A and 100B. Thus, the connectors 10A and 10B are coaxial with one another, and therefore the strings 50A and 50B are also coaxial. Accordingly, any force imparted by the strings 50A and 50B to the connectors 10A and 10B will only tend to pull them apart along their common axis, and will not cause the connectors 10A and 10B to come apart.

The clip ends 200 also assist in confining the forces generated on the connectors 200 to coaxial forces, by inhibiting rotation of one connector relative to the other.

The corners 220 of the beveled areas 180 (such as corners 220B of areas 180B shown in FIG. 7, and as shown in FIG. 10) are preferably formed relatively sharp to assure a secure clip against the section 80A.

Figure 8:
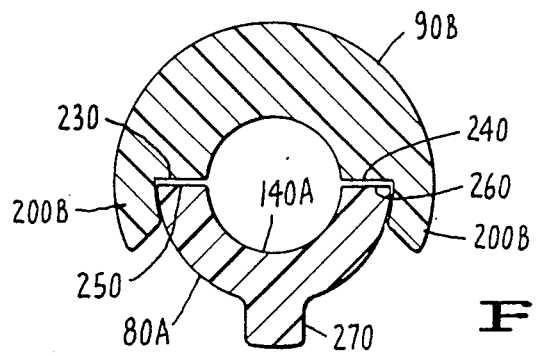
FIG. 8 is a view similar to that of FIG. 7 showing an alternative embodiment of the invention.

FIG. 8 shows an alternative embodiment of section 90B, wherein its inner diameter in the area away from the ends 200B is reduced to match that of the bore 140A. With this configuration, two alignment surfaces 230 and 240 are provided to abut against alignment surfaces 250 and 260 of section 80A. This allows the connectors 10A and 10B to be clipped together in such a way that, when sections 80A and 90B are pressed together, they will snap into place at the right configuration when the surfaces 230 and 250 meet and the surfaces 240 and 260 meet. This helps further ensure that bores 100A and 100B are coaxial.

FIGS. 8, 10 and 10A show an embodiment wherein a stiffening ridge 270 is provided to the section 80A in order to improve its rigidity. Since the connector 10A is preferably formed in a unitary fashion from somewhat resilient plastic, it assists to have extra rigidity provided where the connector 10 is smaller in cross-section.

FIGS. 9, 10 and 10A show the embodiment of FIG. 8 in longitudinal cross-section, in lateral cross-section, and in perspective, respectively. As with FIGS. 3 and 4, exemplary dimensions are given in inches, and features similar to those in FIGS. 3 and 4 are numbered similarly. As shown in both FIGS. 4 and 10, the alignment surfaces 250 and 260 are preferably slightly below the center line 280 drawn across a horizontal diameter of the section 90. In the embodiment of FIG. 8, this ensures that the surfaces 230 and 240 will not abut with surfaces 250 and 260 in such a way as to prevent clip ends 200B from fully engaging section 80A. On the other hand, the distance between surfaces 230/240 and 250/260 should not be so great that ends 180 attain insufficient clipping action around the section 80A. There is therefore a compromise in the offset distance from the center line 280. As shown in FIGS. 4 and 10, in the embodiments shown an offset distance of 0.003 inch has been found to be effective.

Figure 12:
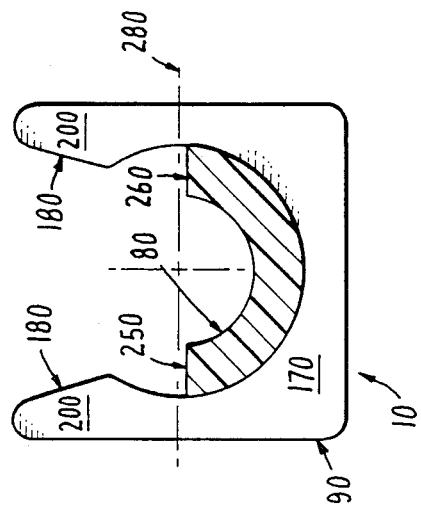
FIG. 12 is a cross-sectional view taken along line 12—12 of FIG. 11.
Figure 11:
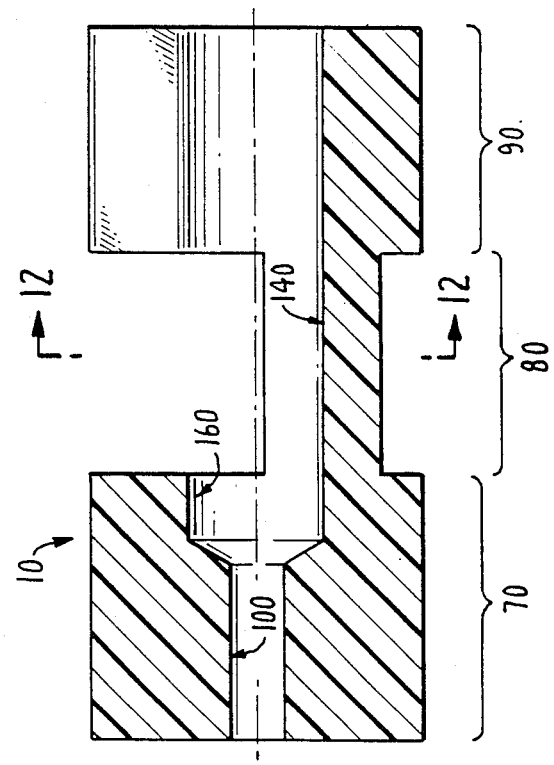
FIG. 11 is a longitudinal sectional view of another alternative embodiment of the invention.

FIGS. 11 and 12 show yet another embodiment of the invention, with features similar to those of the above-described embodiments being numbered similarly. In this embodiment, the beveled ends 180 are greatly elongated, which assists in clipping the clip ends 200 over the section 80 of another connector 10 of the embodiment of FIG. 12. It also assists in removal of the connectors from one another, since a screwdriver, finger or other tool may be used to pry up the ends 200 more easily than with an embodiment wherein the clip ends 200 lie flush against the outer diameter of portion 80 without means for separating them.

With any of the embodiments described herein, the connectors 10 may be separated from one another by twisting or cocking one relative to the other, so that the clip ends 200 are urged away from the section 80, thus spreading them slightly and freeing one connector from the other.

Figure 13:
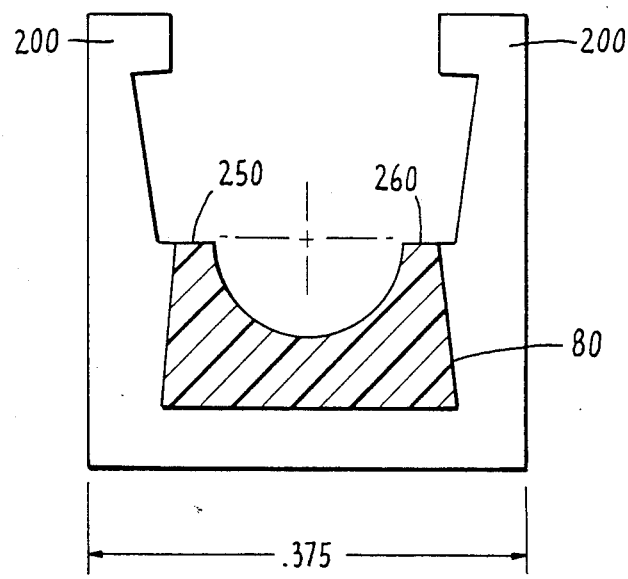
FIG. 13 is a cross-sectional view of an alternative embodiment of the invention.

FIG. 13 shows yet another alternative embodiment of the invention, wherein the cross-sectional area of the section 80 is substantially trapezoidal, and is accommodated by a substantially trapezoidal inner shape between the clip ends 200. It will be appreciated that other configurations are possible, including polygonal shapes besides trapezoids, so long as the inner shape between the clip ends 200 accommodates the outer shape of the section 80, and provides a resilient clipping action wherein the coaxial alignment of the strings 50 is ensured.

It will be appreciated that providing two connectors of identical design significantly reduces manufacturing costs, and avoids the expense and trouble of designing and producing bisexual connectors, i.e. connectors of dual design where one connector has a male end and the other has a female end. However, this does not preclude variations from being made on the foregoing structures. For instance, in certain applications it may be desirable to make a two-connector junction asymmetrical, and yet retain the advantages and substantially the design described above. This might be done, by way of example, by making the outer diameter of section 80B (shown in FIG. 6) slightly larger than that of section 80A, and by conforming the inner diameters of sections 90B and 90B, respectively, to match these outer diameters.

Other modifications and altered structural details may be utilized in accordance with the teaching herein without departing from the spirit and scope of the invention.

What is claimed is:

1. A connector assembly for connecting first and second flexible lines in precise axial alignment, including:
    a first connector having a first axis and a first section for receiving the first flexible line in axial alignment with said first axis, a second section affixed to said first section and having a first outer diameter, a third section affixed to said second section and having a second outer diameter larger than said first outer diameter and a first inner diameter;
    a second connector having a second axis and a fourth section for receiving the second flexible line in axial alignment with the second axis, a fifth section affixed to said fourth section and having a third outer diameter, a sixth section affixed to said fifth section and having a fourth outer diameter larger than said third outer diameter and a second inner diameter;
    wherein said first inner diameter is substantially equal to said third outer, diameter, and said second inner diameter is substantially equal to said first outer diameter, and wherein said third section and sixth section include, respectively, first and second clipping means for reversibly engaging said third and first sections, respectively, for clipping said first and second connectors together with coincident alignment of said first and second axes, wherein forces imparted by the first and second lines on the first and second connectors are resisted by engagement of said third section with said sixth section.

2. The apparatus of claim 1, wherein said first and second connectors are substantially identical, such that said first outer diameter, said third outer diameter, said first inner diameter and said second inner diameter are substantially equal to one another, and such that said second and fourth outer diameters are substantially equal to one another.

3. The apparatus of claim 2, wherein each of said third and sixth sections has an interior shape which substantially matches an exterior shape of each of said second and fifth sections.

4. The apparatus of claim 3, wherein said interior and exterior shapes comprise sections of circles.

5. The apparatus of claim 3, wherein said interior and exterior shapes are polygonal.

6. The apparatus of claim 2, wherein each of said third and sixth sections includes a portion with an inner diameter substantially equal to said first outer diameter, said portion including first abutment surfaces, and wherein said each of said second and fifth sections includes second abutment surfaces, such that said first abutment surfaces contact said second abutment surfaces when said first and second connectors are clipped together.

7. The apparatus of claim 6, wherein:
each said forward portion includes a first abutment surface; and
each said central portion includes a second abutment surface;
such that when said first and second connectors are clipped together, said first and second abutment surfaces contact one another for maintaining the relative positions of said first and second connectors.

8. The apparatus of claim 6, wherein each of said clips includes an elongated section extending away from said central portion to which it is clipped for facilitating separation of said connectors from one another.

9. The apparatus of claim 1, wherein each of said first and second connectors is of unitary construction.

10. The apparatus of claim 1, wherein each of said first and second clipping means is formed from a resilient material for accommodating deformation while clipping to said fourth and second sections, respectively, and for resuming its original shape after said deformation.

11. The apparatus of claim 1, wherein at least one of said second and fourth sections includes a longitudinal ridge for providing increased rigidity.

12. The apparatus of claim 1, wherein each of said first and fourth sections includes a bore for receiving the first and second lines, respectively, and further includes a counterbore at one end of said bore for receiving a knot formed in the end of each of the first and second lines, respectively.

13. An apparatus for joining a pair of flexible lines, including:
first and second substantially cylindrical line connectors, each said connector including a forward portion having a central bore with an inner diameter defining a pair of opposing arcuate clips and a central portion having an outer diameter substantially equal to said inner diameter, each said connector further including a means for attaching one of the flexible lines; wherein
each said clip includes an end, which ends, for each said pair of clips are a distance apart which is less than said outer diameter;
each said forward portion includes a raised portion which has a diameter greater than said outer diameter; and
said connectors are of a resilient material, such that said first connector clips may be spread for fitting over said second connector central portion and said second connector clips may be spread for fitting over said first connector central portion without permanent deformation of said clips, such that said respective raised portions abut one another when said connectors are clipped together, for preventing unclipping of said connectors when axial forces are exerted on the lines.

14. The apparatus of claim 13, wherein each said central portion includes means for providing rigidity thereto.

15. The apparatus of claim 14, wherein said rigidity providing means comprises a longitudinal ridge along said central portion.

* * * * *